United States Patent [19]  
Cryer

[11] 4,129,757  
[45] Dec. 12, 1978

[54] ELECTRICAL SWITCH ASSEMBLY
[75] Inventor: Edward Cryer, Higham, Nr. Burnley, England
[73] Assignee: Lucas Industries Limited, Birmingham, England
[21] Appl. No.: 703,870
[22] Filed: Jul. 9, 1976
[30] Foreign Application Priority Data Jul. 9, 1975 [GB] United Kingdom ............... 28828/75

[51] Int. Cl.² .......................... H01H 9/00; H01H 3/16
[52] U.S. Cl. ..................................... 200/4; 200/61.27; 200/61.54
[58] Field of Search ...................... 200/61.54, 4, 61.27, 200/61.3, 61.34, 61.35, 302

[56] References Cited
U.S. PATENT DOCUMENTS

| 3,604,975 | 9/1971 | Suzuki et al. | 200/61.54 X |
| 3,718,784 | 2/1973 | Wilkinson | 200/61.3 X |
| 3,881,076 | 4/1975 | Latka et al. | 200/61.54 |
| 3,940,579 | 2/1976 | Buhl et al. | 200/61.27 X |
| 4,006,328 | 2/1977 | Kimberlin et al. | 200/61.54 |

FOREIGN PATENT DOCUMENTS

| 1808028 | 2/1970 | Fed. Rep. of Germany | 200/61.27 |
| 1655800 | 8/1971 | Fed. Rep. of Germany | 200/61.54 |
| 1553164 | 12/1968 | France | 200/61.54 |
| 2141048 | 1/1973 | France. | |
| 1179828 | 2/1970 | United Kingdom. | |

Primary Examiner—James R. Scott  
Attorney, Agent, or Firm—Ladas, Parry, Von Gehr, Goldsmith & Deschamps

[57] ABSTRACT

A multiposition, multicontact, hermetically-sealed electrical switch assembly includes a body, a movable element supported by the body for movement relative thereto, and first electrical contacts operable by movement of the element relative to the body. Extending from the movable element to facilitate movement of the element relative to the body is an operating lever and an operating member is carried by the lever adjacent its free end. The operating member is rotatable relative to the lever about the longitudinal axis of the free end region of the lever. A drive piece is mounted adjacent the movable element for rotation relative to the operating lever about the longitudinal axis of the region of the lever adjacent the movable element and second electrical contacts are operable by rotation of the drive piece relative to the lever. A flexible sleeve encircles the lever and couples the operating member to the drive piece whereby rotation of the operating member relative to the lever is transmitted to the drive piece to rotate the drive piece relative to the lever.

6 Claims, 2 Drawing Figures

ELECTRICAL SWITCH ASSEMBLY

BACKGROUND OF THE INVENTION

This invention relates to an electrical switch assembly.

BRIEF SUMMARY OF THE INVENTION

An assembly according to the invention includes, a body, a movable element supported by the body for movement relative thereto, first electrical contacts operable by movement of the element relative to the body, an operating lever extending from the element to facilitate movement of the element relative to the body, an operating member carried by the lever adjacent the free end of the lever, the lever being bent intermediate the operating member and the movable element and the operating member being rotatable relative to the lever about the longitudinal axis of the free end region of the lever, a drive piece adjacent the movable element, the drive piece being rotatable relative to the operating lever about the longitudinal axis of the region of the lever adjacent the movable element, second electrical contacts operable by rotation of the drive piece relative to the lever, and a flexible sleeve encircling the bent region of the lever between the operating member and the drive piece and coupling the operating member to the drive piece whereby rotation of the operating member relative to the lever is transmitted to the drive piece to rotate the drive piece relative to the lever.

Preferably a helical spring encircles said bent region of the lever and supports the sleeve against collapse when the sleeve transmits rotation of the operating member to the drive piece.

Desirably the drive piece includes a flexible diaphragm the periphery of which engages the body and is rotatable relative thereto, the diaphragm closing an aperture in the body through which the lever extends and the diaphragm flexing to permit movement of the lever relative to the body to operate the first electrical contacts.

Conveniently the drive piece operates the second electrical contacts by way of a slider supported for linear sliding movement relative to the body, there being a coupling between the drive piece and the slider whereby the rotation of the drive piece causes linear sliding movement of the slider.

Preferably the movable element is pivotally mounted on a rotor for movement relative to the body about a first axis and the rotor is mounted on the body for movement relative thereto about a second axis lying generally at right angles to the first axis, the movable element and the rotor being movable relative to the body by appropriate movement of the operating lever and there being third electrical contacts operable by movement of the rotor relative to the body.

Conveniently the operating member includes a component displaceable in the direction of the rotational axis of the operating member and there are fourth contacts operable by movement of the component.

Desirably the fourth contacts are housed within the body and the operating lever is hollow, movement of the component being transmitted to the fourth contacts by a flexible rod which extends through the hollow lever.

Preferably the operating member can occupy any one of a plurality of angularly spaced predetermined positions relative to the lever, the positions being defined by a detent mechanism associated with the operating member and the lever.

Desirably the detent mechanism includes a cam form on an inner surface of the operating member engaged by a projection of a plate fixed against rotation relative to the lever.

Conveniently a second detent mechanism associated with the rotor and the body defines three stable positions of the rotor relative to the body and the third contacts are such that in the centre position of the three positions, the contacts are not operated, while in the two outer positions different sets respectively of the third contacts are operated.

BRIEF DESCRIPTION OF THE DRAWINGS

In the accompanying drawings.

DETAILED DESCRIPTION

Figure 1:
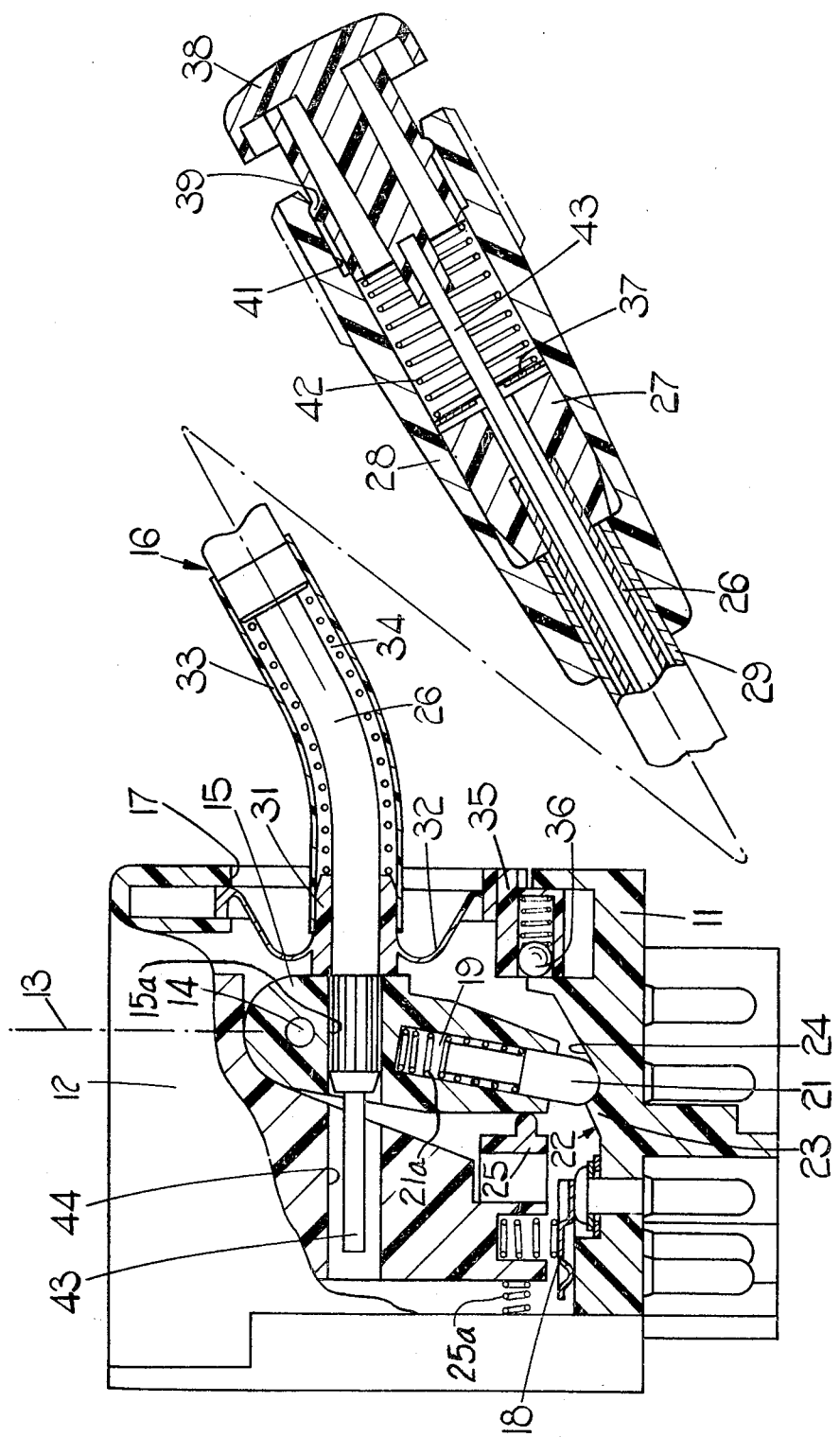
FIG. 1 is a sectional view of part of an electrical switch assembly in accordance with one example of the invention and FIG. 2 is an exploded view of the switching components of the switch assembly.
Figure 2:
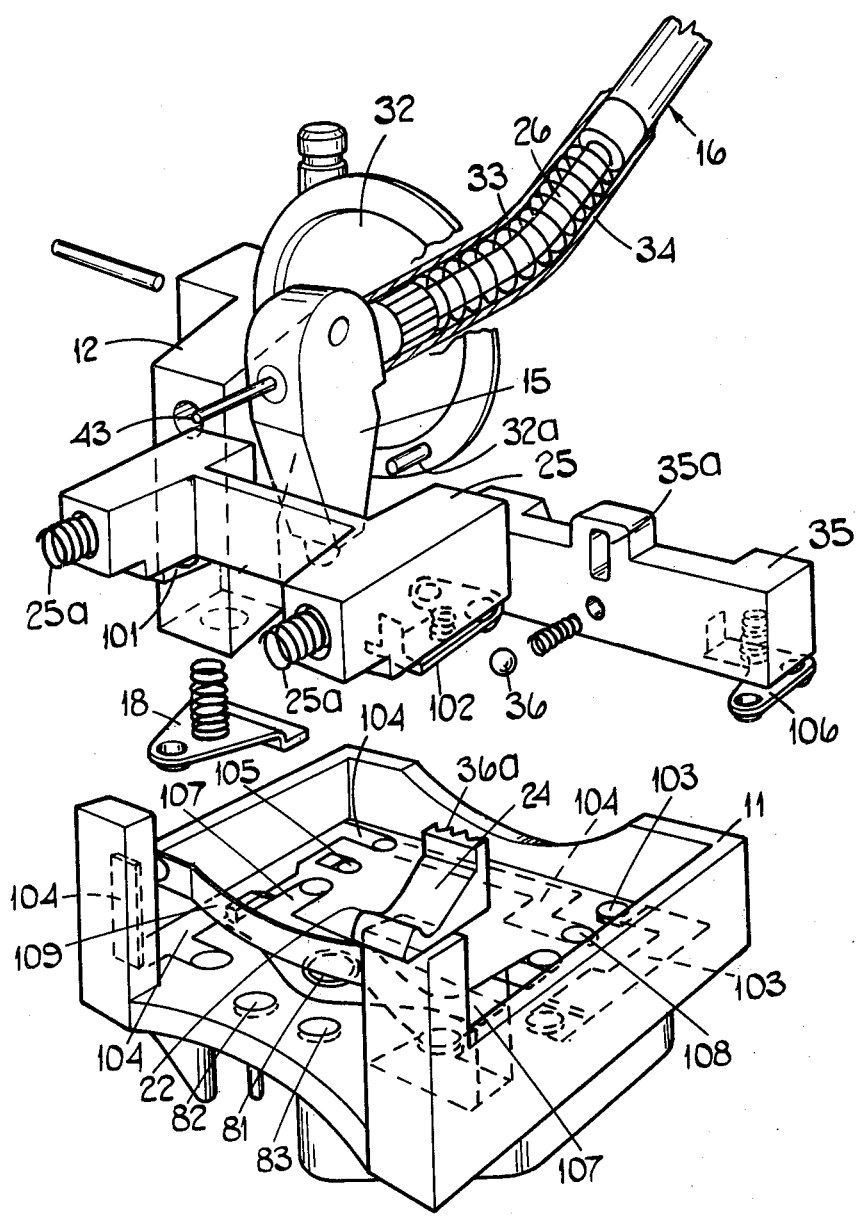

Referring to the drawings, the switch assembly includes a moulded synthetic resin body 11 so arranged that in use it can be fixed to the outer, stationary part of a vehicle steering column. The body 11 is hollow, and within the body 11 is mounted a moulded synthetic resin rotor 12 mounted for pivotal movement relative to the body 11 about an axis indicated by the chain dotted line 13.

Pivotally mounted on the rotor 12 for movement relative thereto about an axis 14 disposed at right angles to the axis 13 is a moulded synthetic resin element 15. In order to facilitate movement of the element 15 relative to the rotor 12, and also to facilitate movement to the rotor 12 relative to the body 11 by way of the element 15, the element 15 is provided with an elongate operating lever assembly 16. The operating lever assembly 16 is secured at one end to the element 15, and extends outwardly from the element, to project from the body 11, by way of an aperture 17 in the body 11. The lever assembly 16 is bent intermediate the element 15 and the free end of the lever assembly so that the axis of the free end region of the lever assembly 16 lies at an obtuse angle to the axis of the end of the lever assembly engaged with the element 15.

The rotor 12 is shown generally in the drawing as a solid component. However, the rotor 12 is in fact hollow, and contains components of a direction indicator mechanism of known form. The direction indicator mechanism supported by the rotor cooperates with a pawl carried by the body 11, the pawl being movable in an operative condition of the direction indicator mechanism into the path of movement of a striker carried by the rotatable part of the associated steering column. As mentioned above, the direction indicator mechanism is of conventional, known form and details of this mechanism form no part of the present invention. It is sufficient to recognize that movement of the rotor 12 about the axis 13 relative to the body 11 operates the direction indicator mechanism, there being a detent arrangement acting between the rotor 12 and the body 11 whereby the rotor can be retained in either of a pair of operative positions spaced on opposite sides of a central rest position. The rotor 12 carries a movable bridging contact 18 which cooperates with fixed contacts 81, 82, 83 carried by the body 11 to complete first and second electrical circuits in the operative positions respectively of the rotor. The direction indicator mechanism is arranged to cause return of the rotor 12 from either of its operative positions to its central rest position as a result of rotation of the steering column from a turn position back to the straight ahead position.

The element 15 is formed with a blind bore 19 from which extends a moulded synthetic resin plunger 21. The plunger 21 is urged outwardly of the bore 19 by a compression spring 21a, and the free end of the plunger 21 abuts a cam track 22 provided on the body 11. The length of the cam track 22 is such that the plunger 21 remains in contact with the cam track throughout the range of movement of the rotor 12 relative to the body 11.

The cam track 22 includes a projection 23 and an inclined ramp 24. As a result of its freedom of movement about the axis 14 the element 15 can occupy either of first and second stable positions, the first stable position being defined by the plunger 21 engaging the far side of the projection 23 from the ramp 24, and the second stable position being defined by the plunger 21 engaging in the V form defined at the junction of the downward slope of the projection 23 and the ramp 24. Additionally, the element 15 can be maintained manually in a third position wherein the plunger 21 is engaged on the ramp surface 24. The third position is an unstable position, and upon release of the lever assembly 16 while the element 15 is in its third position then the action of the compression spring 21a associated with the plunger 21 ensures that the element 15 is pivoted back to its second position.

Housed within the body 11, and positioned adjacent the element 15 is a moulded synthetic resin follower 25. The follower 25 is urged by springs 25a against the element 15, and so follows any movement of the element 15. The follower 25 has associated therewith first and second leaf spring contacts 101 and 102. In the first position of the element 15 the follower 25 holds the second leaf spring contact 102 in engagement with a fixed electrical feed contact 103, and the first leaf spring contact 101 is spaced from a fixed contact 104. In the second position of the element 15 the leaf spring contact 101 is spaced from the fixed contact 104, while the leaf spring contact 102 engages the fixed contact 103. Additionally, the fixed feed contact 104 is engaged by the leaf spring contact 101 in the third position of the element 15, the leaf spring contact 102 remaining engaged with the fixed contact 103 in the third position of the element 15. In use, the movement of the element 15 is utilized to control the main beam and dipped beam filaments of the headlamps of the vehicle utilizing the switch assembly. The fixed electrical contact 103 is an electrical supply contact to which a circuit is completed only when a main lighting control switch is closed. However, the fixed contact 104 is a permanent feed contact, and is independent of the main lighting switch. The leaf spring contact 101 is associated with the main beam filaments of the headlamps by way of a fixed contact 107, while the leaf spring contact 102 is associated with the main and dipped beam fillaments of the headlamps by way of fixed contacts 107, 108. Thus assuming that the main lighting control switch is closed then in the first position of the element 15 the main beam filaments of the headlamps are energised, in the second position of the element 15 there is no electrical circuit to the main beam filaments but the electrical circuit to the dipped beam filaments is completed by way of the leaf spring contact 102. In the third position of the element 15 electrical circuits to both main and dipped beam filaments are completed, the dipped beam filament circuit being completed by way of the fixed contact 103 and the leaf spring contact 102, and the main beam circuit being completed by way of the fixed contact 104 and the leaf spring contact 101. Moreover, It will be appreciated that in the event that the main lighting control switch is in an open condition then the main beam filaments can still be energised by movement of the element 15 to its third position. Since the third position of the element 15 is an unstable position then the facility of flashing the main beams of the headlamps is afforded by the third position of the element 15.

The lever assembly 16 of the switch assembly comprises a main structural member in the form of a hollow metal tube 26. At one end of the hollow metal tube 26 is an interference fit within a corresponding bore 15a in the element 15, and intermediate the element 15 and the free end of the tube 26 the tube is curved so as to define the above-mentioned bend between the free end of the lever assembly and the element 15. The bend is a relatively gentle bend rather than a severe change in direction.

Secured to the free end of the tube 26 is a moulded synthetic resin bush 27. The bush 27 and the adjacent part of the tube 26 are encircled by a moulded synthetic resin sleeve-like operating member 28 which is rotatable relative to the tube 26 and the bush 27 about the longitudinal axis of the free end region of the tube 26. Rigidly secured to the operating member 28 and extending towards the bend in the tube 26 is a short length of metal tube 29 which encircles, and is co-axial with the tube 27. The tube 29 terminates adjacent the bend in the tube 26, and on the side of the bend adjacent the operating member 28. Adjacent the element 15, and supported for rotation on the adjacent part of the tube 26 is a moulded synthetic resin collar 31 having integral therewith a flexible diaphragm 32 which rotatably engages the body 11, and closes the aperture 17 in the body to minimise the risk of ingress of dirt and moisture by way of the aperture 17 into the body 11.

Interconnecting the tube 29 and the collar 31 is a flexible sleeve 33 conveniently formed from polyvinyl chloride, and engaging the collar 31 and the tube 29 by being heat-shrunk into gripping engagement with the tube and the collar. The flexibility of the sleeve 33 permits the sleeve 33 to follow the bend in the tube 26, while remaining substantially co-axial with the tube 26 throughout the bend. The sleeve 33 is provided in order to transmit rotational movement of the operating member 28 to the collar 31 so that both rotate together relative to the tube 26 even though the rotational axis of the collar 31 is disposed, by virtue of the bend in the tube 26, at an obtuse angle to the rotational axis of the operating member 28. A helical compression spring 34 is interposed between the outer surface of the tube 26 and the inner surface of the sleeve 33. The spring 34 abuts the collar 31 and the tube 29 at its ends respectively, and obviously is inherently capable of following the bend of the tube 26. The spring 34 is not anchored at its ends to either the tube 29 or the collar 31, and so does not directly transmit rotational movement of the operating member 28 to the collar 31. The spring 34 is provided in order to support the sleeve 33 against collapse onto the tube 26, and thereby ensure that the sleeve 33 transmits accurately the rotational movement of the member 28. There is a tendency for the flexible sleeve 33 to twist during transmission of torque from the member 28 to the collar 31. Since the sleeve is flexible, in the absence of the spring 34 there would be a danger that this twisting would result in the sleeve 33 collapsing onto the tube 26, thereby impairing the accuracy with which the sleeve 33 transmits rotational movement of the member 28 to the collar 31.

As previously mentioned the outer periphery of the diaphragm 32 is so engaged with the body at the periphery of the aperture 17 that the diaphragm can rotate relative to the body. It will be recognised of course that the lever assembly 16 will, in use, be called upon to perform movement relative to the body 11 to operate the element 15 and the rotor 12. Such movements of the lever assembly 16 within the aperture 17 are permitted by distortion of the diaphragm 32 without displacement of the periphery of the diaphragm from the body 11.

Mounted on the body 11 adjacent the periphery of the diaphragm 32 is a moulded synthetic resin slider 35. The slider 35 is supported by the body 11 for linear sliding movement relative thereto, and can occupy either of three stable, longitudinally spaced, positions relative to the body 11. The three positions are defined by a first detent mechanism acting between the operating member 28 and the bush 27 and a second detent mechanism defined by a ball 36 which is spring urged towards a fixed cam form carried by the body 11. Movement of the diaphragm 32 is transmitted to the slider by way of a yoke 35a integral with the slider 35 and a pin 31a integral with the periphery of the diaphragm 32. The pin 32a engages between the limbs of the yoke 35a, and the yoke and pin connection conerts rotational movement of the diaphragm relative to the body 11 into linear movement of the slider 35 relative to the body 11. A moveable contact (not shown) is carried by the slider and co-operates with fixed electrical contacts 104, 105 carried by the body 11. In the first position of the slider 35 relative to the body the movable contact engages an insulating region of the body 11, and is spaced from the fixed contacts 104, 105. In the second and third positions of the slider the movable contact engages the fixed contacts 104 105, and so completes a first electrical circuit while in the third position of the slider a further movable contact 106 on the slider 35 engages the fixed contacts 103, 104 and so completes a second electrical circuit. In the intended use of the switch assembly the first electrical circuit controlled by the slider 35 is the side and tail lamp circuit of the vehicle while the second electrical circuit is the side and tail lamp circuit and the headlamp circuit of the vehicle. Thus in the first position the lighting circuits of the vehicle are off, in the second position the side and tail lamp circuits are completed, and in the third position in addition to the side and tail lamp circuits the headlamp circuit is completed. Thus in the third position an electrical supply is completed to the fixed contact 103 mentioned above in connection with the operation of the contacts associated with the element 15. The first detent assembly which aids the ball 36 and its cam form in defining the first, second and third positions of the slider relative to the body comprises a resilient metal disc 37 which abuts the free end of the bush 27 and which has a downwardly projecting flange engaging a corresponding flat surface on the periphery of the bush 27. Thus the disc 37 cannot rotate relative to the bush 27, and accordingly rotation of the operating member 28 takes place relative not only to the bush 27 but also relative to the disc 37. The flange of the disc 37 includes a projection which extends radially outwardly from the periphery of the bush 27 and engages a cam form provided on the inner peripheral wall of the operating member 28. The cam form includes three recesses, and the projection of the disc 37 can engage in any one of the three recesses dependent upon the relative rotational positions of the disc and the operating member 28. The flange of the disc 37 is resilient, and thus as the operating member 28 is rotated relative to the bush 27 and the disc 37 the projection is permitted, by flexure of the associated flange, to ride from one recess into the next adjacent recess. The spacing of the three recesses relative to one another corresponds to the spacing of the first, second and third positions of the slider, so that when the projection of the disc 37 occupies the first recess the slider 35 is in its first position, and similarly rotation of the operating member 28 to cause the projection to engage in the second recess moves the slider 35 to its second position and rotation of the operating member 28 to cause the projection to engage in the third recess moves the slider 35 to its third position.

The operating member 28 is supported against longitudinal movement relative to the tube 26 in one direction by the tube 29, the sleeve 33 and the spring 34, the collar 31, and the element 15, and is supported against longitudinal movement in the opposite direction by abutment of an internal shoulder of the operating member 28 with an end surface of the bush 27. However, disposed in the open, free end of the operating member 28 is a moulded synthetic resin plug 38 which is capable of sliding movement relative to the operating member 28 in the direction of the rotational axis of the operating member 28. The plug 38 has an integral, outwardly extending rib 39 which is engaged in a peripheral channel 41 in the inner surface of the operating member 28. The width of the channel 41 defines the range of movement of the plug 38 relative to the operating member 28, and the plug 38 is engaged as a snap-fit with the operating member 28. The plug 38 is urged to a rest position relative to the operating member 28, wherein the rib 39 engages the outer wall of the channel 41, by means of a compression spring 42 acting between the plug 38 and the disc 37. In addition to urging the plug 38 to its rest position the spring 42 also retains the disc 37 in abutting engagement with the end face of the bush 27 remote from the tube 26.

Secured to the plug 38 is a flexible nylon rod 43 which extends from the plug 38 through an aperture in the disc 37, the bore of the bush 27 and the tube 26 to terminate within a bore 44 in the rotor 12. Adjacent the end of the rod 43 remote from the plug 38 there is positioned a leaf spring contact 109 which, by virtue of its inherent resilience, occupies a rest position spaced from an associated fixed contact 104. However, depression of the plug 38 into the operating member 28 against the action of the spring 42 causes the free end of the rod 43 to push the leaf spring contact 109 from its rest position, into engagement with the fixed contact 104. Similarly, upon release of the plug 38 the spring 42 restores the plug 38 to its rest position and the inherent resilience of the leaf spring contact 109 restores the leaf spring contact 109 to its rest position spaced from the fixed contact 104. Thus the plug 38 in effect defines the operating member of a normally open push-button switch, and in use the leaf spring contact 109 and fixed contact 104 are associated with the horn of the vehicle. Depression of the plug 38 against the spring 42 completes the horn circuit, and release of the plug 38 then causes de-energization of the horn. The leaf spring contact 109 which is engaged by the rod 43 is arcuate, having its centre of curvature, in the rest position of the leaf spring contact, lying on the axis 13. Thus the operation of the horn contacts is ensured regardless of the position of the rotor 12 relative to the body 11. It will be understood that the rod 43 is sufficiently flexible to pass around the bend in the tube 26, and to slide around the bend when the plug 38 is moved, but is sufficiently rigid to ensure that the associated leaf spring can be flexed into engagement with the relevant fixed contact.

All of the electrical contacts of the switch assembly with the exception of those which are merely bridging contacts, require an external connection. These external connections are made by way of pin terminals projecting from the exterior of the body 11. The pin terminals are connected internally of the body to their respective electrical contacts, and are so arranged on the exterior of the body as to be engageable by a single plug-type connector. Thus the plug-type connector will be part of the wiring harness of the vehicle, and the electrical connections to the switch will be made in use, in the single operation of engaging the plug-type connector with the body 1. The individual switches of the assembly are operated respectively by depression of the plug 38, rotation of the operating member 28, and movement of the lever assembly 16 relative to the body 11 in either of two mutually perpendicular directions.

I claim:

1. An electrical switch assembly including a body, movable means supported on the body for movement relative thereto, first and second sets of electrical contacts operable by movement of said movable means relative to the body in first and second generally mutually perpendicular directions respectively, an operating lever extending from the body and coupled to said movable means to facilitate movement of said movable means relative to the body in either of said mutually perpendicular directions, an operating member rotatably mounted on the lever adjacent the free end of the lever for movement relative to the lever about the axis of the free end region of the lever, the lever being bent intermediate the operating member and the movable means, a third set of electrical contacts supported by the body and operated by rotation of the operating member relative to the lever, a drive piece adjacent said movable means, said drive piece being rotatable relative to the operating lever about the longitudinal axis of that region of the lever adjacent the movable means to operate said third set of electrical contacts, a flexible sleeve encircling the bent region of the lever between the operating member and the drive piece, said sleeve coupling the operating member to the drive piece whereby rotation of the operating member relative to the lever is transmitted to the drive piece to rotate the drive piece relative to the lever and operate said third set of contacts, said drive piece including a flexible diaphragm through which the lever extends, the periphery of the diaphragm rotatably engaging the body and the diaphragm closing an aperture in the body through which the lever extends, the diaphragm flexing to permit movement of the lever relative to the body to operate said movable means, but transmitting rotational movements of said sleeve so as to operate said third set of contacts.

2. An assembly as claimed in claim 1 wherein said movable means comprises a movable element pivotally mounted on a rotor for movement relative to the body about a first axis, the rotor being mounted on the body for movement relative thereto about a second axis lying generally at right angles to the first axis, the movable element and the rotor being movable relative to the body by appropriate movements of the operating lever, movement of the movable element about said first axis operating said first set of contacts and movement of the rotor relative to the body about the second axis operating said second set of electrical contacts.

3. An assembly as claimed in claim 1, wherein a helical spring encircles said bent region of the lever and supports said sleeve against collapse when the sleeve transmits rotation of the operating member to the drive piece.

4. An assembly as claimed in claim 1, wherein said drive piece operates said third electrical contacts by way of a slider supported for linear sliding movement relative to the body, there being a coupling between the drive piece and the slider whereby the rotation of the drive piece causes linear sliding movement of the slider.

5. An assembly as claimed in claim 1 wherein the operating member can occupy any one of a plurality of angularly spaced predetermined positions relative to the lever, said positions being defined by a detent mechanism associated with the operating member and the lever.

6. An assembly as claimed in claim 5 wherein the detent mechanism includes a cam form on an inner surface of the operating member engaged by a projection of a plate fixed against rotation relative to the lever.

* * * * *